(12) United States Patent
Kowalczyk et al.

(10) Patent No.: US 9,885,847 B2
(45) Date of Patent: Feb. 6, 2018

(54) CABLE PULLING ASSEMBLY

(75) Inventors: Scott C. Kowalczyk, Savage, MN (US); Jonathan Walter Coan, Savage, MN (US); Jonathan R. Kaml, Shakopee, MN (US)

(73) Assignee: CommScope Technologies LLC, Hickory, NC (US)

( * ) Notice: Subject to any disclaimer, the term of this patent is extended or adjusted under 35 U.S.C. 154(b) by 598 days.

(21) Appl. No.: 12/775,011

(22) Filed: May 6, 2010

(65) Prior Publication Data

US 2010/0322584 A1    Dec. 23, 2010

Related U.S. Application Data

(60) Provisional application No. 61/176,721, filed on May 8, 2009, provisional application No. 61/264,309, filed on Nov. 25, 2009.

(51) Int. Cl.
*G02B 6/44* (2006.01)
*H02G 1/08* (2006.01)

(52) U.S. Cl.
CPC ......... *G02B 6/4465* (2013.01); *H02G 1/081* (2013.01)

(58) Field of Classification Search
CPC ...... G02B 6/54; G02B 6/4463; G02B 6/4465; G02B 6/4466
See application file for complete search history.

(56) References Cited

U.S. PATENT DOCUMENTS

| | | |
|---|---|---|
| 2,231,919 A | 2/1941 | Kent |
| 3,672,006 A | 6/1972 | Fidrych |
| 3,858,848 A | 7/1975 | MacFetrich |
| 3,906,619 A | 9/1975 | Shaffer |
| 4,368,910 A | 1/1983 | Fidrych |
| 4,453,291 A | 6/1984 | Fidrych |
| 4,460,159 A | 7/1984 | Charlebois et al. |
| 4,684,161 A | 8/1987 | Egner et al. |
| 4,684,211 A | 8/1987 | Weber et al. |
| 4,736,978 A | 4/1988 | Cielker |
| 5,013,125 A | 5/1991 | Nilsson et al. |

(Continued)

FOREIGN PATENT DOCUMENTS

| | | |
|---|---|---|
| DE | 42 00 865 A1 | 7/1993 |
| JP | 59-177504 | 10/1984 |

(Continued)

OTHER PUBLICATIONS

International Search Report and Written Opinion dated Aug. 18, 2010.

(Continued)

*Primary Examiner* — John M Bedtelyon
(74) *Attorney, Agent, or Firm* — Merchant & Gould P.C.

(57) ABSTRACT

A cable pulling assembly includes an enclosure that is adapted for enclosing an end of a fiber optic cable. The enclosure includes a first member that defines a first cavity. The first cavity is adapted to receive a portion of the end of the fiber optic cable. The enclosure further includes a second member that is selectively engaged to the first member. The second member defines a second cavity. The second member is structurally identical to the first member. The enclosure is adapted to transfer a tensile force applied to the enclosure to the strength layer of the fiber optic cable.

22 Claims, 14 Drawing Sheets

(56) References Cited

U.S. PATENT DOCUMENTS

| | | |
|---|---|---|
| 5,039,196 A | 8/1991 | Nilsson |
| 5,067,843 A | 11/1991 | Nova |
| 5,122,007 A | 6/1992 | Smith |
| 5,133,583 A | 7/1992 | Wagman et al. |
| 5,134,677 A * | 7/1992 | Leung et al. .................. 385/84 |
| 5,245,730 A | 9/1993 | Martin |
| 5,283,930 A | 2/1994 | Krauss |
| 5,308,026 A | 5/1994 | Shaw |
| 5,480,203 A | 1/1996 | Favalora et al. |
| 5,863,083 A | 1/1999 | Giebel et al. |
| 5,938,180 A | 8/1999 | Walsten |
| 6,266,469 B1 | 7/2001 | Roth |
| 6,396,993 B1 * | 5/2002 | Giebel ................ G02B 6/3807 385/136 |
| 6,398,422 B1 | 6/2002 | Szilagyi et al. |
| 6,719,274 B2 | 4/2004 | Bowling |
| 6,993,237 B2 | 1/2006 | Cooke et al. |
| 7,079,734 B2 * | 7/2006 | Seddon et al. ................. 385/102 |
| 7,246,789 B2 | 7/2007 | Ames et al. |
| 7,481,585 B2 * | 1/2009 | Scadden et al. ................ 385/75 |
| 7,878,717 B2 * | 2/2011 | Schube ............... G02B 6/3816 385/100 |
| 8,272,787 B2 * | 9/2012 | Lu ....................... G02B 6/4439 385/135 |
| 8,412,017 B2 * | 4/2013 | Kowalczyk .......... G02B 6/4465 385/136 |
| 8,577,199 B2 * | 11/2013 | Pierce ..................... G02B 6/54 385/136 |
| 2006/0133748 A1 | 6/2006 | Seddon et al. |
| 2008/0240658 A1 | 10/2008 | Leeman et al. |
| 2009/0238534 A1 | 9/2009 | Ahmed |
| 2009/0286038 A1 | 11/2009 | Swift et al. |
| 2011/0135268 A1 | 6/2011 | Rudenick et al. |

FOREIGN PATENT DOCUMENTS

| | | | |
|---|---|---|---|
| WO | WO 2005/072395 A2 | | 8/2005 |
| WO | WO 2008/036994 A1 | | 4/2008 |
| WO | WO 2009/040567 | * | 4/2009 .......... G02B 6/4465 |
| WO | WO 2009/040567 A1 | | 4/2009 |

OTHER PUBLICATIONS

International Search Report and Written Opinion cited in International Application No. PCT/US2010/057972 dated Aug. 30, 2011.
U.S. Non-Final Office Action for U.S. Appl. No. 12/953,630 dated Aug. 28, 2012.

* cited by examiner

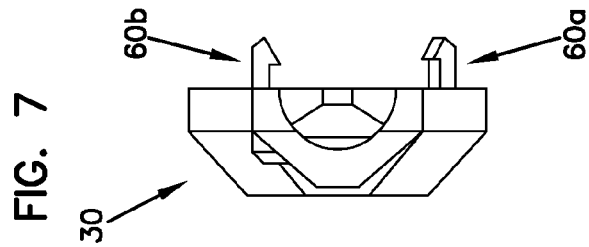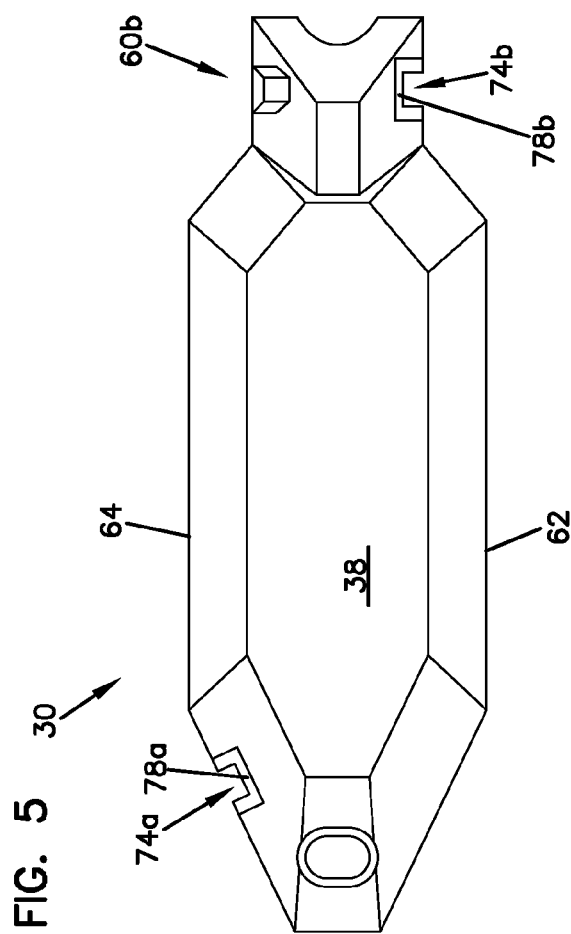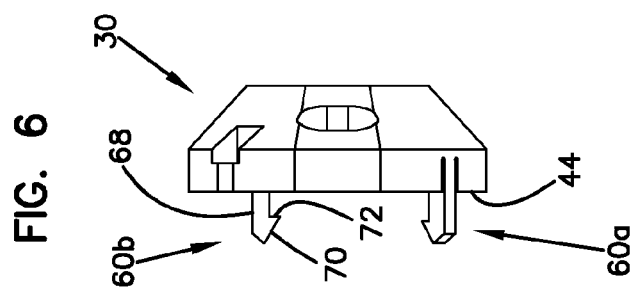

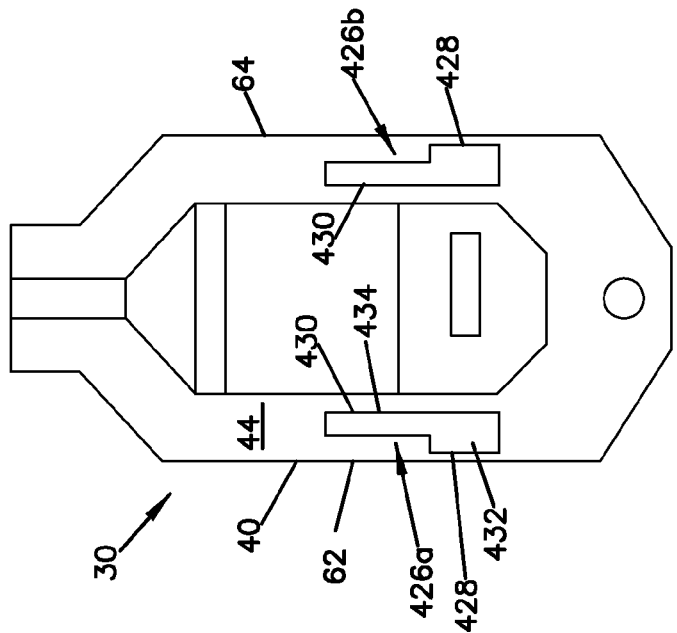
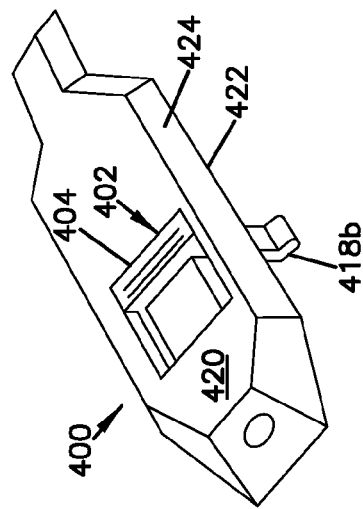
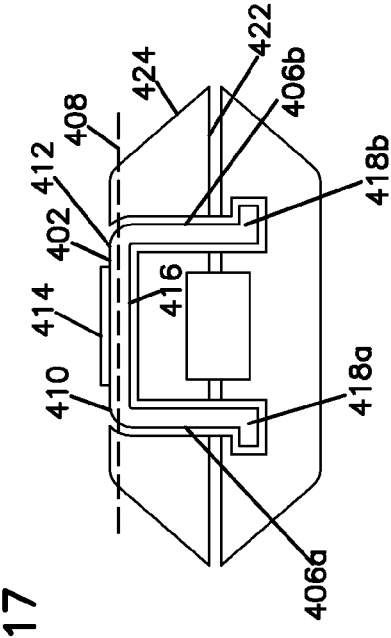

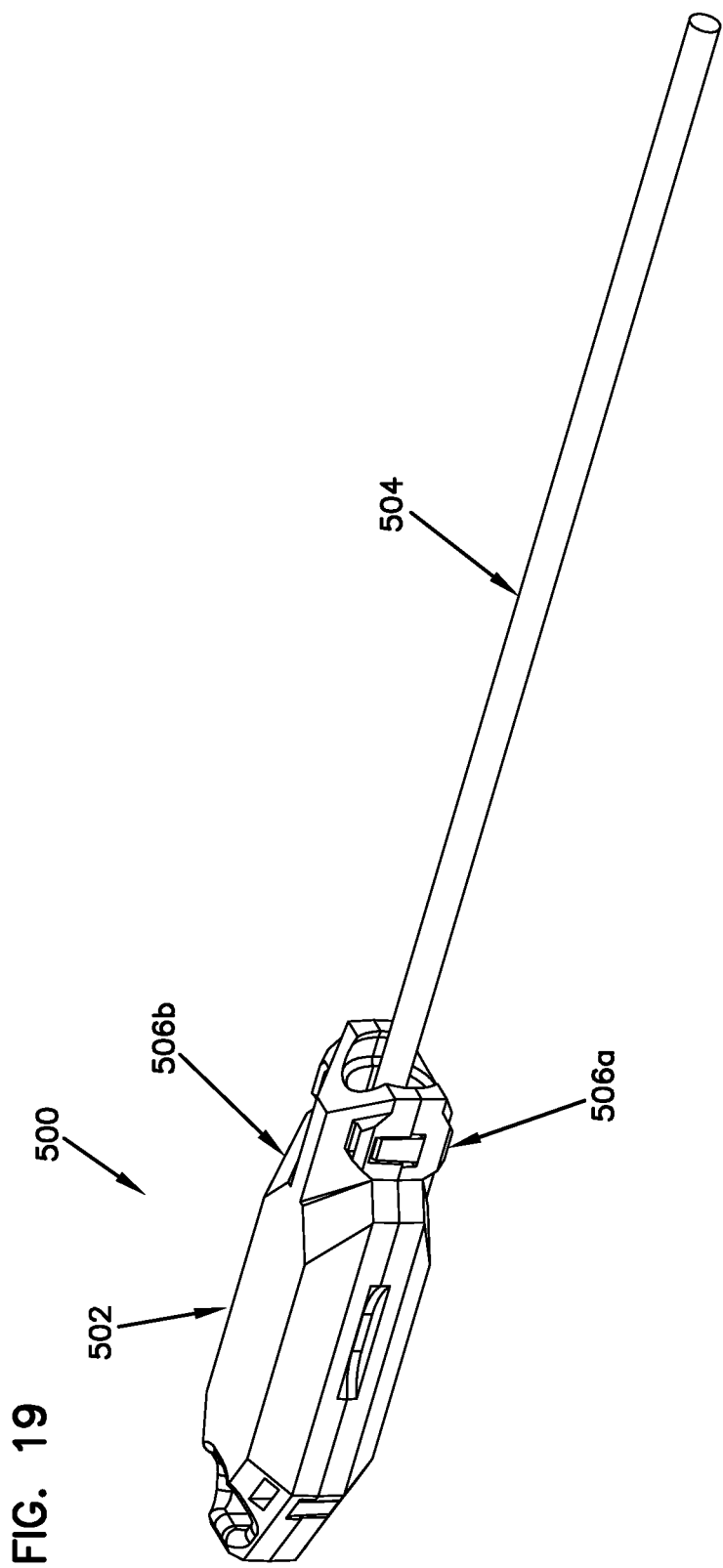

CABLE PULLING ASSEMBLY

CROSS REFERENCE TO RELATED APPLICATION

The present application claims priority to U.S. Provisional Patent Application Ser. No. 61/176,721, entitled CABLE PULLING ASSEMBLY and filed on May 8, 2009, and U.S. Provisional Patent Application Ser. No. 61/264,309, entitled CABLE PULLING ASSEMBLY and filed on Nov. 25, 2009, the disclosures of which are hereby incorporated by reference in their entirety.

BACKGROUND

As demand for telecommunications increases, optical fiber services are being extended in more and more areas. In order for a residence or business to access these optical fiber services, fiber optic cables must be installed in these residences and businesses. In some cases, the fiber optic cables are installed in existing structures. In other cases, these fiber optic cables are installed in new constructions.

In either case, however, fiber optic cables are usually routed through enclosed spaces, such as between support structures disposed inside walls. In order to get the fiber optic cable through these enclosed spaces, cable pullers can be used. However, cable pullers are not always preferred since the size of cable pullers can prevent the cable from being pulled through small enclosed spaces.

SUMMARY

An aspect of the present disclosure relates to a cable pulling assembly. The cable pulling assembly includes an enclosure that is adapted for enclosing an end of a fiber optic cable. The enclosure includes a first member that defines a first cavity. The first cavity is adapted to receive a portion of the end of the fiber optic cable. The enclosure further includes a second member that is selectively engaged to the first member. The second member defines a second cavity. The second member is structurally identical to the first member. The enclosure is adapted to transfer a tensile force applied to the enclosure to the strength layer of the fiber optic cable.

Another aspect of the present disclosure relates to a method of installing a cable pulling assembly about an end of a fiber optic cable. The method includes the steps of stripping an outer jacket off an end of a fiber optic cable so that strength members of the fiber optic cable are exposed. The end of the fiber optic cable is inserted into a blind cavity of a first member of an enclosure of a cable pulling assembly. An adhesive is added to the first cavity of the first member so that the adhesive bonds the first member to the strength members. A second member of the enclosure is engaged to the first member.

Another aspect of the present disclosure relates to a cable pulling assembly. The cable pulling assembly includes an enclosure adapted for enclosing an end of a fiber optic cable. The enclosure includes a first member having a first body. The first body includes a longitudinal surface and defines a first cavity having an opening in the longitudinal surface. The first member also includes a first plurality of resilient tabs engaged to the first body. The first plurality of resilient tabs extends beyond the longitudinal surface of the first body. The enclosure further includes a second member that is in snap-fit engagement with the first member. The second member includes a longitudinal surface and defines a second cavity having an opening in the longitudinal surface of the second body. The second member also includes a second plurality of resilient tabs engaged to the second body. The second plurality of resilient tabs extends beyond the longitudinal surface of the first body and is adapted for engagement with the first member. The second member is structurally identical to the first member. The enclosure is adapted to transfer a tensile force applied to the enclosure to the strength layer of the fiber optic cable.

A variety of additional aspects will be set forth in the description that follows. These aspects can relate to individual features and to combinations of features. It is to be understood that both the foregoing general description and the following detailed description are exemplary and explanatory only and are not restrictive of the broad concepts upon which the embodiments disclosed herein are based.

DRAWINGS

FIG. 5 is a bottom view of the first member of FIG. 3.

FIG. 6 is a left side view of the first member of FIG. 3.

FIG. 7 is a right side view of the first member of FIG. 3.

FIG. 16 is a perspective view of an alternate embodiment of a second member of a cable pulling assembly.

FIG. 17 is a cross-sectional view of the cable pulling assembly.

FIG. 18 is a top view of an alternate embodiment of a first member of the cable pulling assembly.

FIG. 19 is a perspective view of an alternate embodiment of a cable pulling assembly.

DETAILED DESCRIPTION

Reference will now be made in detail to the exemplary aspects of the present disclosure that are illustrated in the accompanying drawings. Wherever possible, the same reference numbers will be used throughout the drawings to refer to the same or like structure.

Figure 1:
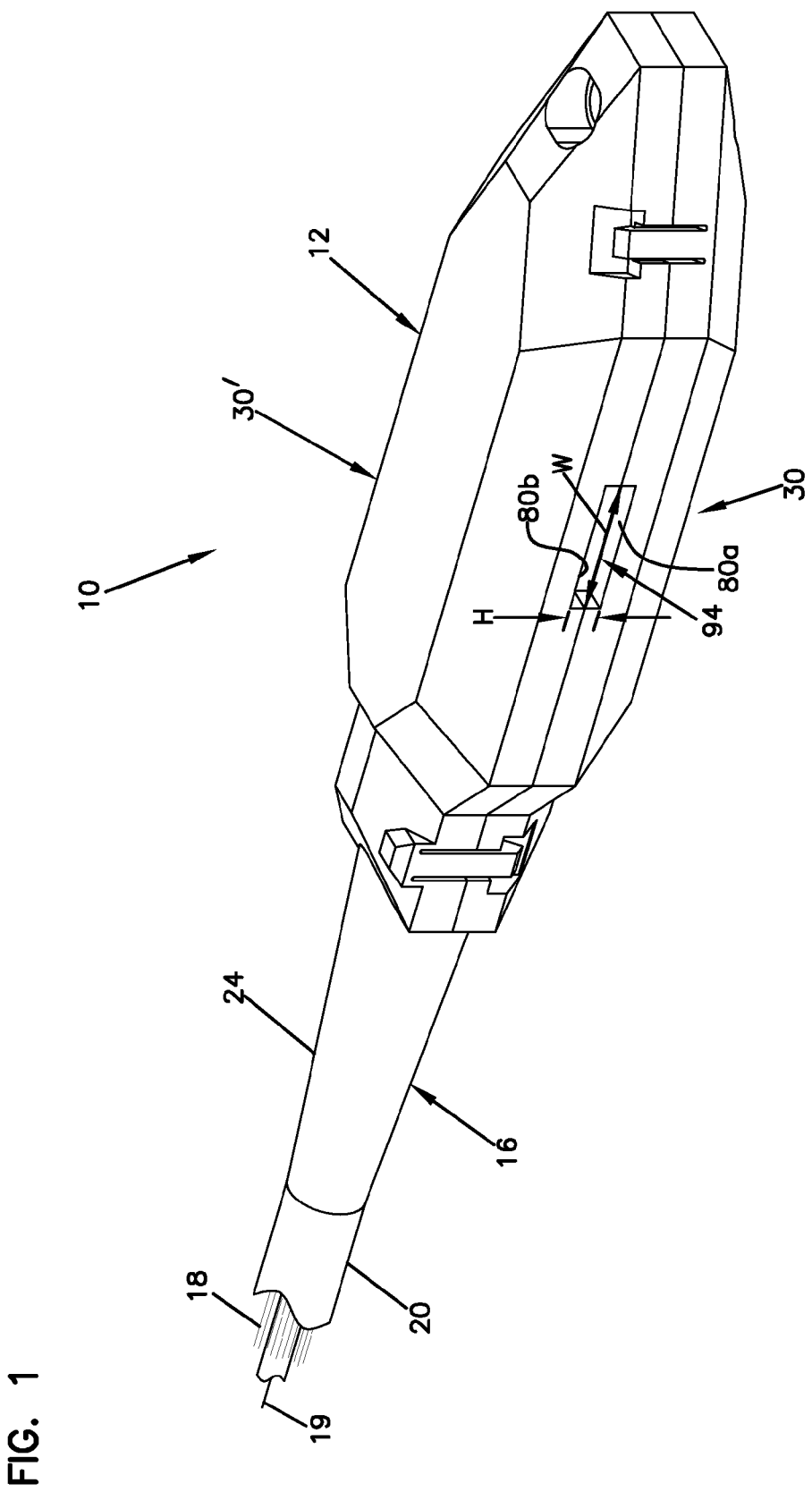
FIG. 1 is a perspective view of a cable pulling assembly having exemplary features of aspects in accordance with the principles of the present disclosure.
Figure 2:
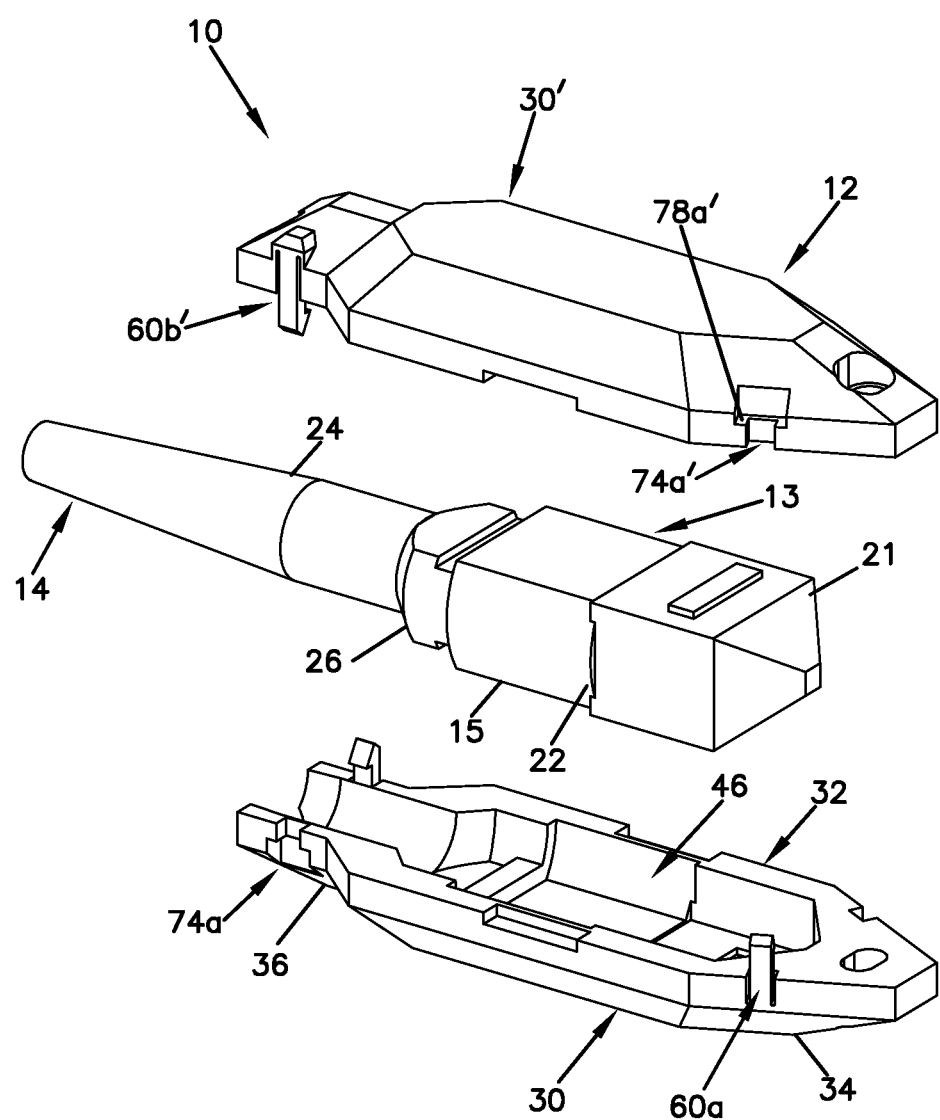
FIG. 2 is an exploded perspective view of the cable pulling assembly of FIG. 1.
Figure 3:
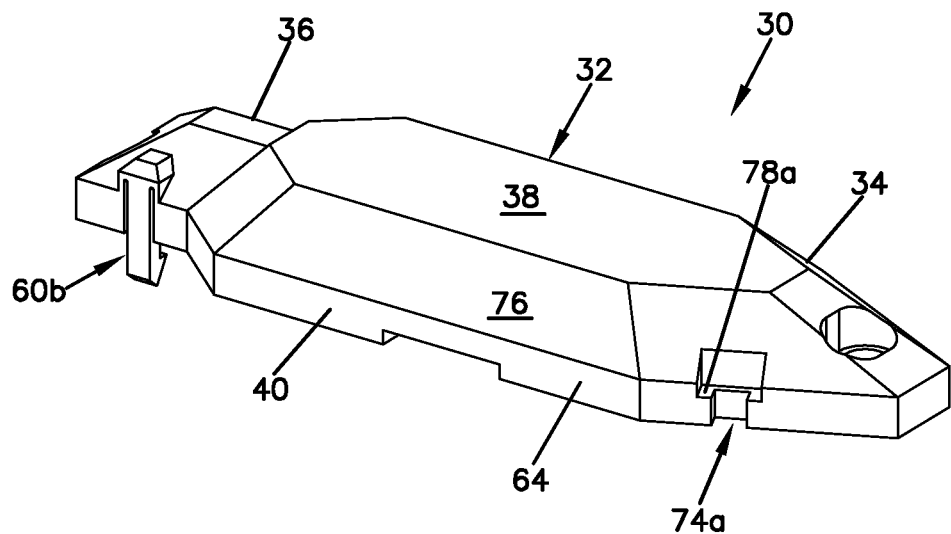
FIG. 3 is a perspective view of a first member of the cable pulling assembly of FIG. 1.
Figure 4:
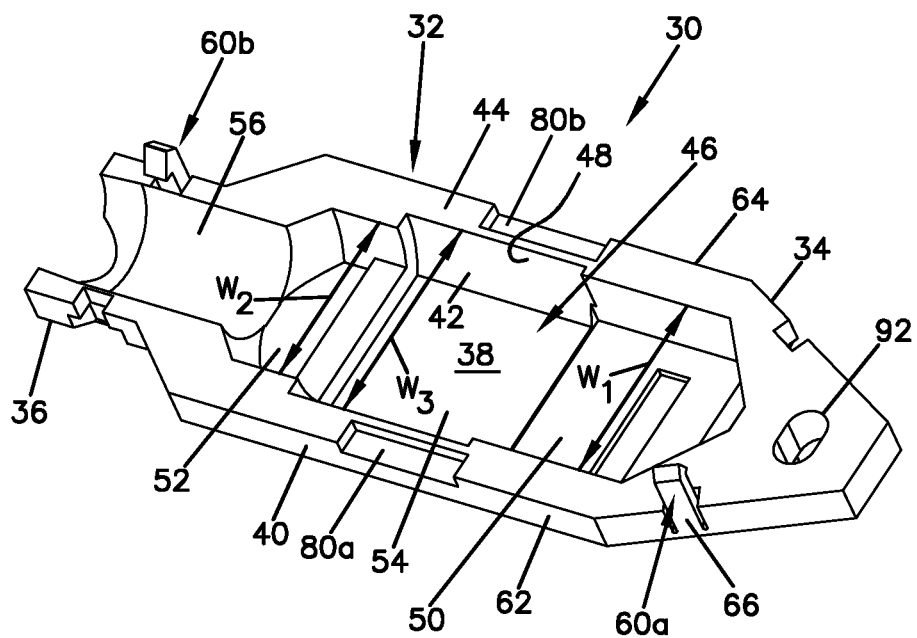
FIG. 4 is an alternative perspective view of the first member of FIG. 3.
Figure 8:
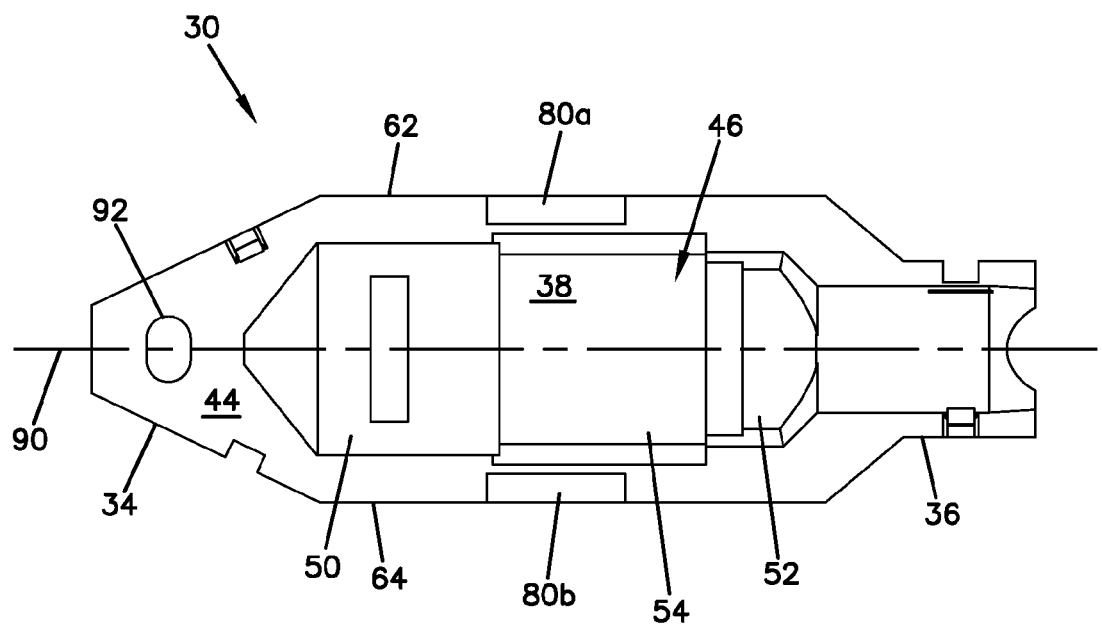
FIG. 8 is a top view of the first member of FIG. 3.
Figure 9:
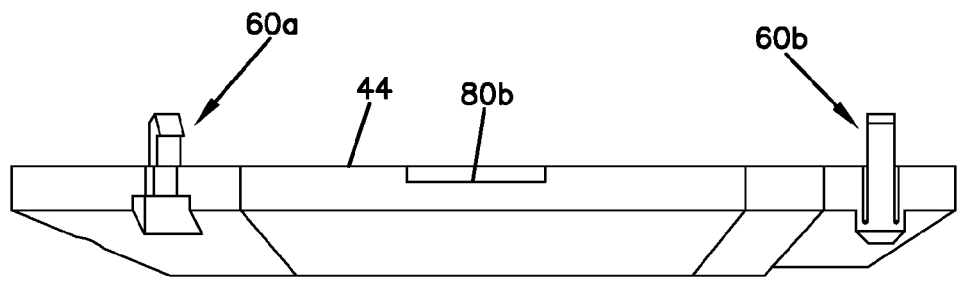
FIG. 9 is a front view of the first member of FIG. 3.

Referring now to FIGS. 1 and 2, a cable pulling assembly, generally designated 10, is shown. The cable pulling assembly 10 includes an enclosure 12. The enclosure 12 is adapted to enclose an end 13 of a fiber optic cable 14.

In one aspect of the present disclosure, the end 13 of the fiber optic cable 14 includes a connector 15. The connector 15 may be a multi-fiber connector or a single fiber connector. The connector 15 is engaged to the fiber optic cable 14. In one aspect of the present disclosure, the fiber optic cable 14 includes a strength layer 18 that surrounds an optical fiber 19. The strength layer 18 is engaged to the connector 15 through crimping. This engagement of the connector 15 to the strength layer 18 allows axial force applied to the connector 15 to be applied to the strength layer 18.

The strength layer 18 is adapted to inhibit axial tensile loading from being applied to the optical fiber 19. In certain embodiments, the strength layer 18 can include yarns, fibers, threads, tapes, films, epoxies, filaments or other structures. In a preferred embodiment, the strength layer 18 includes aramid yarns (e.g., KEVLAR® yarns). An outer jacket 20 is disposed around the strength layer 18.

In one aspect of the present disclosure, the end 13 of the fiber optic cable 14 further includes a dust cap 21 disposed over a first axial end 22 of the connector 15. A strain relief boot 24 is disposed at a second axial end 26 of the connector 15.

The enclosure 12 includes a first member 30 and a second member 30'. In one aspect of the present disclosure, the first member 30 is releasably engaged to the second member 30'.

Referring now to FIGS. 2-9, the first member 30 is shown. The first member 30 includes a body 32. The body 32 of the first member 30 includes a first axial end portion 34 and an oppositely disposed second axial end portion 36.

The body 32 further includes a base 38 and a sidewall 40 that extends outwardly from the base 38. The sidewall 40 includes a first end 42 that is engaged to the base 38 and an oppositely disposed second end 44. The second end 40 is generally planar in shape. In one aspect of the present disclosure, the first end 42 is integral with the base 38.

The base 38 and the sidewall 40 cooperatively define a connector cavity 46. The connector cavity 46 is adapted to receive a portion of the end 13 of the fiber optic cable 14. In one aspect of the present disclosure, the connector cavity 46 is a blind cavity. As a blind cavity, the connector cavity 46 does not extend through the first and second axial end portions 34, 36 of the body 32. The blind cavity prevents the fiber optic cable 14 from passing through the first and second axial ends 34, 36 of the body 32 of the enclosure 12.

The connector cavity 46 of the first member 30 includes an opening 48 through which the portion of the end 13 of the fiber optic cable 14 enters the connector cavity 46. The opening 48 is defined by the second end 44 of the sidewall 40.

The connector cavity 46 further includes a first end portion 50 disposed in the first axial end portion 34 of the body 32, a second end portion 52 disposed in the second axial end portion 36 and a center portion 54 disposed between the first and second end portions 50, 52. In one aspect of the present disclosure, the first end portion 50 of the connector cavity 46 has a width $W_1$ while the second end portion 52 and the center portion 54 have widths $W_2$ and $W_3$, respectively. In one aspect of the present disclosure, the width $W_3$ of the center portion 54 is greater than the widths $W_1$, $W_2$ of the first and second end portions 50, 52. In another aspect of the present disclosure, the width $W_1$ of the first end portion 50 is greater than the width $W_2$ of the second end portion 52.

The first end portion 50 of the connector cavity 46 is adapted to receive a portion of the dust cap 21 disposed over the first axial end 22 of the connector 15. The second end portion 52 and the center portion 54 are adapted to receive a portion of the connector 15.

In one aspect of the present disclosure, the width $W_1$ of the first end portion 50 is greater than the width of the dust cap 22 of the end 13 of the fiber optic cable 14. In one aspect of the present disclosure, the clearance between the width $W_1$ of the first end portion 50 and the width of the dust cap 22 is greater than or equal to about 0.005 inches. In another aspect of the present disclosure, the clearance between the width $W_1$ of the first end portion 50 and the width of the dust cap 22 is in the range of about 0.005 to about 0.010 inches.

In one aspect of the present disclosure, the widths $W_2$, $W_3$ of the second end portion 52 and the center portion 54 are greater than the width of the connector 15 of the end 13 of the fiber optic cable 14. In one aspect of the present disclosure, the clearance between the widths $W_2$, $W_3$ of the second end portion 52 and the center portion 54 and the width of the connector 15 is greater than or equal to about 0.005 inches. In another aspect of the present disclosure, the clearance between the widths $W_2$, $W_3$ of the second end portion 52 and the center portion 54 and the width of the connector 15 is in the range of about 0.005 to about 0.010 inches.

The second axial end portion 36 of the body 32 defines a channel 56. The channel 56 extends from the second end portion 52 of the connector cavity 46 through the second axial end portion 36 of the body 32. In one aspect of the present disclosure, the channel 56 is semi-cylindrical in shape. The channel 56 is adapted to receive a portion of the fiber optic cable 14. In one aspect of the present disclosure, the channel 56 is adapted to receive a portion of the strain relief boot 24.

The sidewall 40 of the body 32 includes a first resilient tab 60a and a second resilient tab 60b. In one aspect of the present disclosure, the first resilient tab 60a is disposed at the first axial end portion 34 of the body 32 while the second resilient tab 60b is disposed at the second axial end portion 36 of the body 32. In another aspect of the present disclosure, the first resilient tab 60a is disposed on a first side 62 of the body 32 while the second resilient tab 60b is disposed on an opposite second side 64 of the body 32.

In one aspect of the present disclosure, the first and second resilient tabs 60a, 60b are substantially structurally similar. As the first and second resilient tabs 60a, 60b are substantially similar, the first and second resilient tabs 60a, 60b will be collectively and singularly referred to as resilient tab 60 for ease of description purposes.

The resilient tab 60 includes a base end 66 and a free end 68. The base end 66 is engaged to the sidewall 40. In one aspect of the present disclosure, the base end 66 is integral with the sidewall 40. The free end 68 extends outwardly from the second end 44 of the sidewall 40 in a direction that is generally perpendicular to the second end 44. The free end 68 includes a lip portion 70 that extends outwardly from the free end 68. The lip portion 70 includes a lip 72.

The sidewall 40 of the body 32 defines a first groove 74a disposed in an exterior surface 76 of the sidewall 40 that extends from the second end 44 of the sidewall 40 toward the base 38 of the body 32. In one aspect of the present disclosure, the first groove 74a is disposed in the first axial end portion 34 of the first member 30 on the second side 64 of the body 32. In another aspect of the present disclosure, the first groove 74a is generally aligned with the first resilient tab 60a disposed on the first side 62 of the body 32. The first groove 74a includes a first rim 78a.

The sidewall 40 of the body 32 further defines a second groove 74b disposed in the exterior surface 76 of the sidewall 40 that extends from the second end 44 of the sidewall 40 toward the base 38 of the body 32. In one aspect of the present disclosure, the second groove 74b is disposed in the second axial end portion 36 of the first member 30 on the first side 62 of the body 32. In another aspect of the present disclosure, the second groove 74b is generally aligned with the second resilient tab 60b disposed on the second side 64 of the body 32. The second groove 74b includes a second rim 78b.

In one aspect of the present disclosure, the second end 44 of the sidewall 40 of the body 32 defines a first recess 80a. The first recess 80a includes a first opening 82 in the exterior surface 76 of the sidewall 40 on the first side 62 of the body 32. The first recess 80a is disposed between the first and second resilient tabs 60a, 60b. In one aspect of the present disclosure, the first recess 80a is disposed equidistantly between the first and second resilient tabs 60a, 60b.

In one aspect of the present disclosure, the second end 44 of the sidewall 40 further defines a second recess 80b. The second recess 80b includes a second opening 84 in the exterior surface 76 of the sidewall 40 on the second side 64 of the body 32. In one aspect of the present disclosure, the second recess 80b is aligned with the first recess 80a. In another aspect of the present disclosure, the second recess 74b is disposed equidistantly between the first and second resilient tabs 60a, 60b.

In one aspect of the present disclosure, the first member 30 defines a longitudinal axis 90 that extends in an axial direction from the first end portion 34 to the second end portion 36. The first member 30 further defines a thru-passage 92 disposed in the first end portion 34 of the body 32. The thru-passage 92 is a hole that extends through the second end 44 of the sidewall 40 at the first end portion 34 in a direction that is generally perpendicular to the longitudinal axis 90. The thru-passage 92 is adapted to receive a pulling member (e.g., rope, chain, etc.) for pulling the cable pulling assembly 10 through a passage.

In one aspect of the present disclosure, the second member 30' is substantially structurally similar to the first member 30. In another aspect of the present disclosure, the second member 30' is structurally identical to the first member 30. As the features of the second member 30' are substantially structurally similar to the features of the first member 30 described above, the features of the second member 30' will not be described further. The structurally similar or structurally identical features of the second member 30' will have the same reference numerals as the corresponding features of the first member 30 followed by a prime (') symbol.

Figure 10:
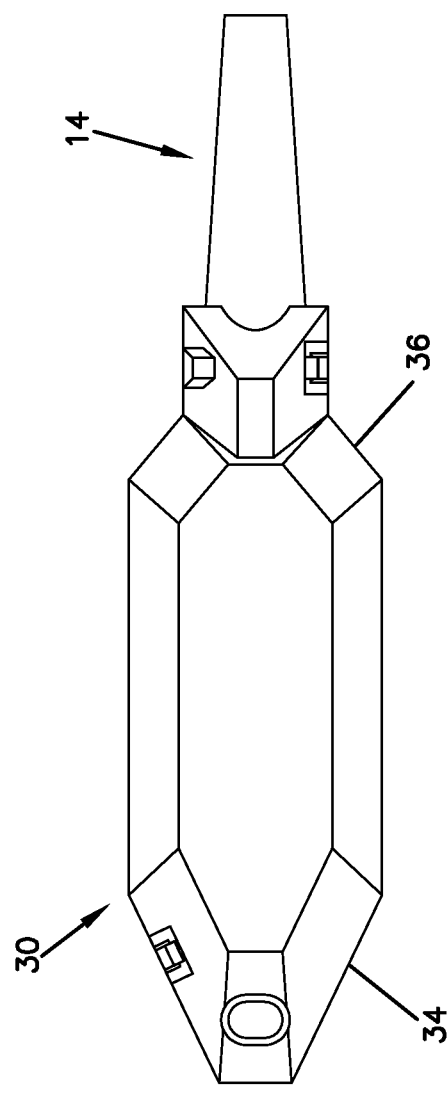
FIG. 10 is a bottom view of the first member of FIG. 3 with a connectorized end of a fiber optic cable inserted into a connector cavity.
Figure 11:
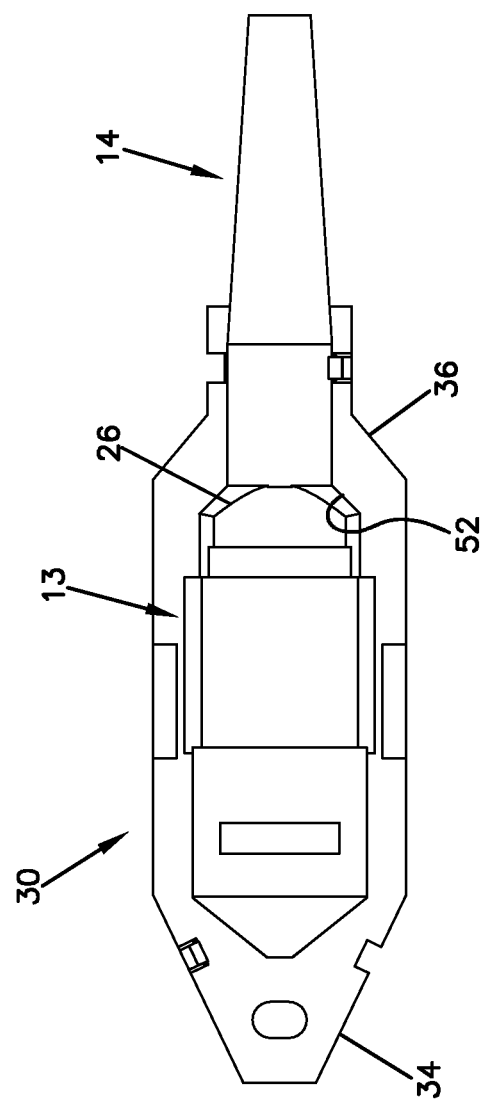
FIG. 11 is a top view of the first member of FIG. 10.
Figure 12:
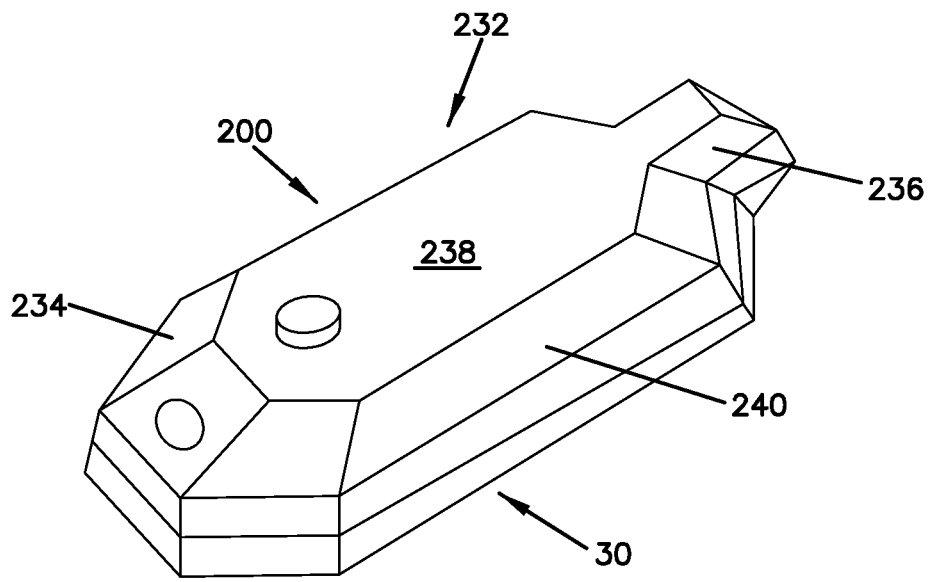
FIG. 12 is an isometric view of a cable pulling assembly having a release actuator disposed in an alternate embodiment of a second member.
Figure 13:
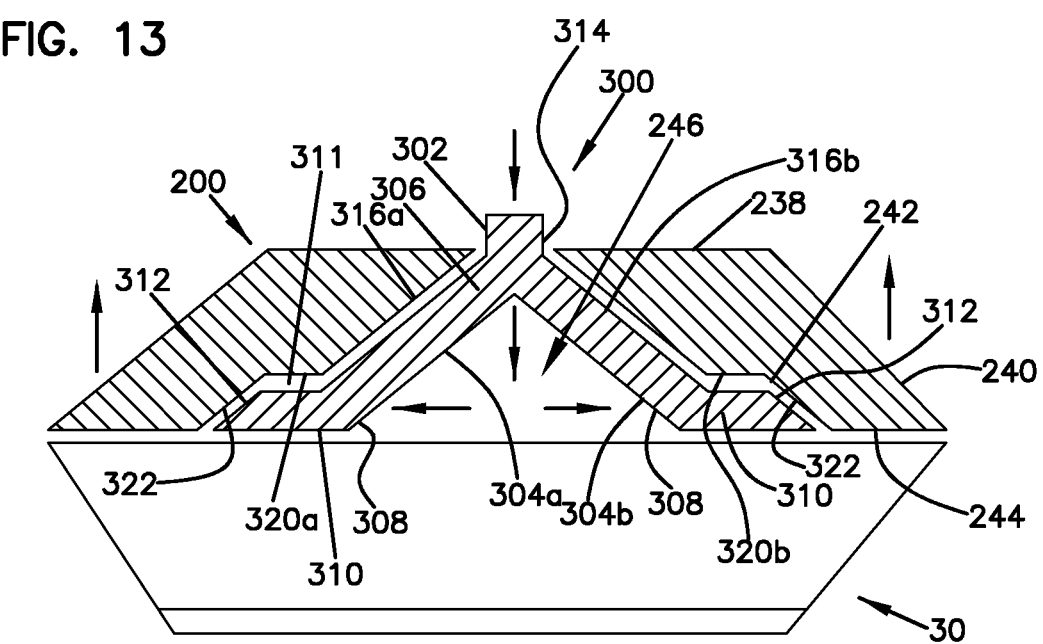
FIG. 13 is a left-side, partial cross-sectional view of the cable pulling assembly of FIG. 12.
Figure 14:
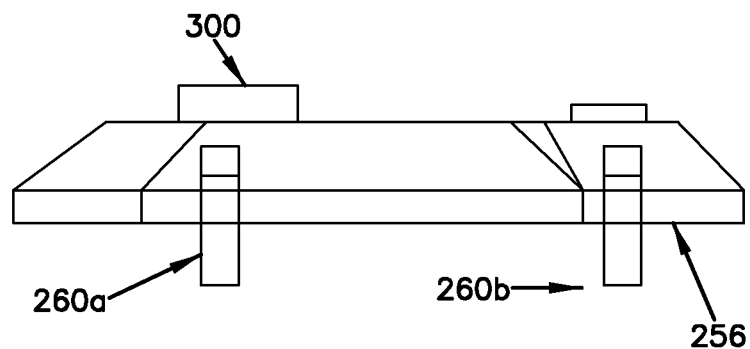
FIG. 14 is front view of the second member of the cable pulling assembly of FIG. 12.
Figure 15:
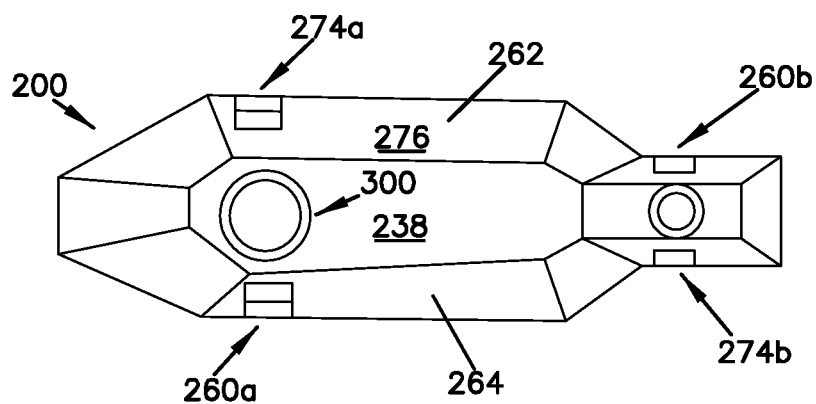
FIG. 15 is a top view of the second member of FIG. 14.

Referring now to FIGS. 2, 10 and 11, the installation of the end 13 of the fiber optic cable 14 into the cable pulling assembly 10 will be described. A first portion of the connector 15 is inserted into the center portion 54 of the connector cavity 46 of the first member 30 so that the strain relief boot 24 is disposed in the channel 56 of the first member 30. In one aspect of the present disclosure, the first portion of the connector 15 disposed in the connector cavity 46 is about half of the connector 15.

With the first portion of the connector 15 disposed in the connector cavity 46 of the first member 30, the second member 30' is aligned with the first member 30 so that the remaining portion of the connector 15 is aligned with the connector cavity 46' of the second member 30'. The second member 30' is then engaged to the first member 30. In one aspect of the present disclosure, the first member 30 is in snap-fit engagement with the second member 30'.

As the second member 30' engages the first member 30, the first resilient tab 60a of the first member 30 enters the first groove 74a' of the second member 30' while the first resilient tab 60a' of the second member 30' enters the first groove 74a of the first member 30. The second resilient tab 60b of the first member 30 enters the second groove 74b' of the second member 30' while the second resilient tab 60b' of the second member 30' enters the second groove 74b of the first member 30. The second member 30' is fully engaged to the first member 30 when the lips 72 of the first and second resilient tabs 60a, 60b of the first member 30 are engaged with the first and second rims 78a', 78b' of the second member 30' and when the lips 72' of the first and second resilient tabs 60a', 60b' of the second member 30' are engaged with the first and second rims 78a, 78b of the first member 30.

With the end 13 of the fiber optic cable 14 disposed in the enclosure 12 of the cable pulling assembly 10, the fiber optic cable 14 can be pulled through passages (e.g., conduits, etc.). As the cable pulling assembly 10 is pulled, the second portion 52 of the connector cavity 46 of the enclosure 12 is engaged with the second axial end 26 of the connector 15. The tensile force from pulling the cable pulling assembly 10 is applied to the second axial end 26 of the connector 15. As the connector 15 is crimped to the strength layer 18 of the fiber optic cable 14, the tensile force applied to the connector through the second portion 52 of the enclosure is transferred to the strength layer 18.

Referring now to FIG. 1, the removal of the end 13 of the fiber optic cable 14 from the cable pulling assembly 10 will be described. The enclosure 12 defines an indentation 94. The indentation 94 is formed from the first recess 80a in the first member 30 and the second recess 80b' in the second member 30' when the first and second members 30, 30' are engaged. The indentation 94 includes a width W that is greater than a height H. The indentation 94 is adapted to receive a tool (e.g., a flat tipped tool, a flat-head screwdriver, a coin, etc.).

To disengage the second member 30' from the first member 30, a generally flat tip of the tool is inserted into the indentation 94. The tip of the tool includes a width that is greater than a height of the tip. The tool is then rotated so that one edge of the flat tip of the tool contacts the second member 30' while an opposite edge of the flat tip contacts the first member 30. The tool is rotated until the first member 30 is disengaged from the second member 30'.

In one embodiment, the tool is a coin. In this embodiment, the coin is inserted into the indentation 94 and rotated about an axis of the coin that extends along a diameter of the coin. The coin is rotated so that one edge of the coin contacts the second member 30' while an opposite edge of the coin contacts the first member 30. The coin is rotated until the first member 30 is disengaged from the second member 30'.

Referring now to FIGS. 12-15, an alternate embodiment of a second member 200 is shown. In one aspect of the present disclosure, the second member 200 is adapted to engage the first member 30.

The second member 200 includes a body 232. The body 232 of the second member 200 includes a first axial end portion 234 and an oppositely disposed second axial end portion 236.

The body 232 further includes a base 238 and a sidewall 240 that extends outwardly from the base 238. The sidewall 240 includes a first end 242 that is engaged to the base 238 and an oppositely disposed second end 244.

The base 238 and the sidewall 240 of the second member 200 cooperatively define a connector cavity 246. The connector cavity 246 is adapted to receive a portion of the end 13 of the fiber optic cable 14.

The second axial end portion 236 of the second member 200 defines a channel 256. The channel 256 extends from a second end portion of the connector cavity 246 through the second axial end portion 236 of the body 232. In one aspect of the present disclosure, the channel 256 is semi-cylindrical in shape. The channel 256 is adapted to receive a portion of the fiber optic cable 14. In one aspect of the present disclosure, the channel 256 is adapted to receive a portion of the strain relief boot 24.

The sidewall 240 of the body 232 includes a first resilient tab 260a and a second resilient tab 260b. In one aspect of the present disclosure, the first resilient tab 260a is disposed at the first axial end portion 234 of the body 232 of the second member 200 while the second resilient tab 260b is disposed at the second axial end portion 236 of the body 232. In another aspect of the present disclosure, the first resilient tab 260a is disposed on a first side 262 of the body 232 while the second resilient tab 260b is disposed on an opposite second side 264 of the body 232.

The sidewall 240 of the second member 200 defines a first groove 274a disposed in an exterior surface 276 of the sidewall 240 that extends from the second end 244 of the sidewall 240 toward the base 238 of the body 232. In one aspect of the present disclosure, the first groove 274a is disposed in the first axial end portion 234 of the second member 200 on the second side 264 of the body 232. In another aspect of the present disclosure, the first groove 274a is generally axially aligned with the first resilient tab 260a disposed on the first side 262 of the body 232.

The sidewall 240 of the second member 200 further defines a second groove 274b disposed in the exterior surface 276 of the sidewall 240 that extends from the second end 244 of the sidewall 240 toward the base 238 of the body 232. In one aspect of the present disclosure, the second groove 274b is disposed in the second axial end portion 236 of the second member 200 on the first side 262 of the body 232. In another aspect of the present disclosure, the second groove 274b is generally axially aligned with the second resilient tab 260b disposed on the second side 264 of the body 232.

The second member 200 includes a release actuator 300. The release actuator 300 is adapted to selectively disengage the first member 30 from the second member 200 when the first member 30 is engaged to the second member 200.

In one aspect of the present disclosure, the release actuator 300 is a button-type release. The release actuator 300 includes an actuator 302 and a leg 304. In one aspect of the present disclosure, the release actuator 300 includes a first leg 304a and a second leg 304b. Each of the first and second legs 304a, 304b includes a first end 306 and an oppositely disposed second end 308. The first end 306 of each of the first and second legs 304a, 304b is engaged to the actuator 302. The first and second legs 304a, 304b extend outwardly from the actuator 302. In one aspect of the present disclosure, the first and second legs 304a, 304b extend outwardly from the actuator 302 at an oblique angle.

Each of the second ends 308 of the first and second legs 304a, 304b includes a protrusion 310. The protrusion 310 includes an end portion 311 having an angled surface 312 so that the end portion 311 is generally wedge shaped.

The second member 200 defines a thru-hole 314 in the base 238 and a first passage 316a in a first interior surface 318a of the sidewall 240 on the first side 262 and a second passage 316b in a second interior surface 318b of the sidewall 240 on the second side 264.

The thru-hole 314 in the base 238 is adapted to receive the actuator 302 of the release actuator 300. In one aspect of the present disclosure, the thru-hole 314 is sized so that the actuator 302 is axially movable in the thru-hole 314.

The first and second passages 316a, 316b open toward the connector cavity 246 of the second member 200. The first and second passages 316a, 316b are adapted to receive the first and second legs 304a, 304b of the release actuator 300.

The second member 200 further defines a first slot 320a that extends from the first passage 316a outwardly toward the exterior surface 276 of the first side 262 of the second member 200 and a second slot 320b that extends outwardly from the second passage 316b toward the exterior surface of the second side 264. The first and second slots 320a, 320b are adapted to receive the protrusions 308 of the first and second legs 304a, 304b of the release actuator 300.

Each of the first and second slots 320a, 320b includes an end surface 322. In one aspect of the present disclosure, the end surface 322 of each of the first and second slots 320a, 320b is oriented at an oblique angle relative to the second end 244 of the sidewall 240. In one aspect of the present disclosure, the end surfaces 322 of the first and second slots 320a, 320b are adapted for engagement with the angled surfaces 312 of the protrusions 308 of the release actuator 300. The first and second slots 320a, 320b further include openings 322a, 322b in the second end 244 of the sidewall 240.

The release actuator 300 is adapted to selectively disengage the first member 30 and the second member 200 on actuation. To actuate the release actuator 300, the actuator 302 is pressed downwardly toward the base 238 of the second member 200. As the actuator 302 is pressed in a downward direction, the protrusions 308 abut the second end 44 of the sidewall 40 of the first member 30 and slide outwardly toward the exterior 76 of the sidewall 40. As the protrusions 308 extend outwardly, the angled surfaces 312 of the protrusions 308 abut the end surfaces 322 of the first and second slots 320a, 320b of the second member 200. As the protrusions 308 continue to extend outwardly, the abutment of the angled surfaces 312 of the protrusions of the release actuator 300 and the end surfaces 322 of the second member 200 causes the second member 200 to lift away from the second end 44 of the sidewall 40 of the first member 30. As the second member 200 lifts away from the first member 30, the second member 200 is disengaged from the first member 30.

Referring now to FIGS. 16-18, an alternate embodiment of a second member 400 is shown. The second member 400 includes a release actuator 402 that is adapted to engage the first and second members 30, 400. The release actuator 402 includes an actuator 404 and a plurality of legs 406. In one aspect of the present disclosure, the release actuator 402 includes a first leg 406a and a second leg 406b.

The actuator 404 extends along a longitudinal axis 408 and includes a first end 410 and an oppositely disposed second end 412. The actuator 404 includes a top surface 414 and an oppositely disposed bottom surface 416. In one aspect of the present disclosure, the top surface 414 is a textured surface.

The first and second legs 406a, 406b of the release actuator 402 extend outwardly from the bottom surface 416 of the actuator 404. The first leg 406a extends outwardly from the first end 410 of the actuator 404 while the second leg 406a extends outwardly from the second end 412 of the actuator 404. In one aspect of the present disclosure, the release actuator 402 is generally U-shaped.

The first leg 406a includes a first tab 418a that extends outwardly from the first leg 406a in a direction that is generally perpendicular to the first leg 406a. The second leg 406b includes a second tab 418b that extends outwardly from the second leg 406b in a direction that is generally perpendicular to the second leg 406b.

The release actuator 402 is slidably disposed in the second member 400. The top surface 414 of the actuator 404 is accessible through a base 420 of the second member 400. With the release actuator 402 disposed in the second member 400, the first and second tabs 418a, 418b extend outwardly from a second end 422 of the sidewall 424 of the second member 400. In one aspect of the present disclosure, the release actuator 402 is moveable between a first position (shown in FIG. 17) and a second position.

The second end 44 of the sidewall 40 of the first member 30 defines a first release groove 426a disposed on the first side 62 and a second release groove 426b disposed on the second side 64. The first and second release grooves 426a, 426b are adapted to receive the first and second tabs 418a, 418b of the second member 400. In one aspect of the present disclosure, each of the first and second release grooves 426a, 426b includes a first portion 428 and a second portion 430. The first portions 428 of the first and second release grooves 426a, 426b define openings 432 on the second end 44 of the sidewall 40 that are sized to receive the first and second tabs 418a, 418b. The second portions 430 of the first and second release grooves 426a, 426b define openings 434 that are smaller than the openings 432 of the first portions 428.

To engage the first and second members 30, 400, the second end 40 of the first member 30 is aligned with a second end 440 of the second member 400. The release actuator 402 is moved to the second position so that the first and second tabs 418a, 418b are aligned with the first portions 428 of the first and second release grooves 426a, 426b of the first member 30. With the first and second tabs 418a, 418b and the first and second release grooves 426a, 426b aligned, the first and second members 30, 400 are engaged so that the second end 44 of the sidewall 40 of the first member 30 abuts the second end 422 of the sidewall 424 of the second member 400. With the second ends 44, 422 of the first and second members 30, 400 in engagement, the actuator 404 is moved to the first position. With the actuator 404 in the first position, the first and second tabs 418a, 418b are captured in the second portions 428 of the first and second release grooves 426 since the openings 434 of the second portions 428 are not wide enough to allow the first and second tabs 418a, 418b to be removed from the first and second release grooves 426.

In one aspect of the present disclosure, the fiber optic cable 14 is connectorized in a clean factory environment. Once the fiber optic cable 14 is connectorized, the cable pulling assembly 10 is mounted over the end 13. The cable pulling assembly 10 maintains the cleanliness of the end 13 of the fiber optic cable 14 during cable routing and/or storage so that once the cable pulling assembly 10 is removed, the connector 15 can be connected at a desired telecommunications connection without cleaning an end face of the connector 15.

Figure 20:
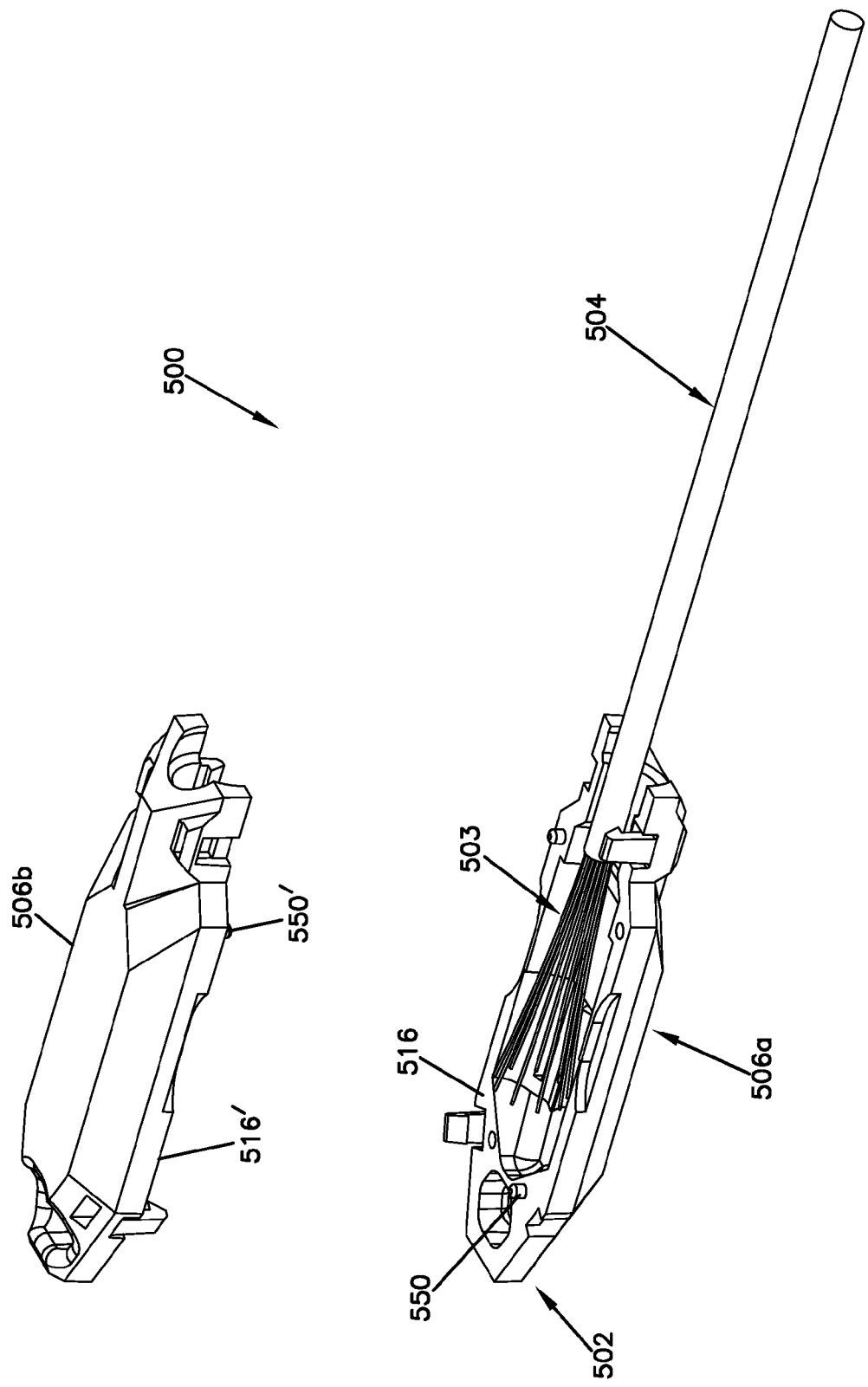
FIG. 20 is an exploded perspective view of the cable pulling assembly of FIG. 19.

Referring now to FIGS. 19 and 20, an alternate embodiment of a cable pulling assembly, generally designated 500, is shown. The cable pulling assembly 500 is generally similar to the cable pulling assembly 10 previously described.

The cable pulling assembly 500 includes an enclosure 502. The enclosure 502 is adapted to enclose an end 503 of a fiber optic cable 504.

The enclosure 502 of the cable pulling assembly 500 includes a first member 506a and a second member 506b. The first member 506a is adapted for releasable engagement to the second member 506b. In one embodiment, the first and second members 506a, 506b are manufactured from a transparent material. In another embodiment, the first and second members 506a, 506b are manufactured from a translucent material. In another embodiment, one of the first and second members 506a, 506b is transparent or translucent. The transparent or translucent material allows the contents of the enclosure 502 to be viewed without disengaging the first and second members 506a, 506b.

In the depicted embodiment of FIGS. 19 and 20, the first and second members 506a, 506b are structurally identical. As the first and second members 506a, 506b are structurally identical, only the first member 506a will be described below for ease of description purposes only. It will be understood that the structural features of the first member 506a are included in the second member 506b unless otherwise stated.

Figure 21:
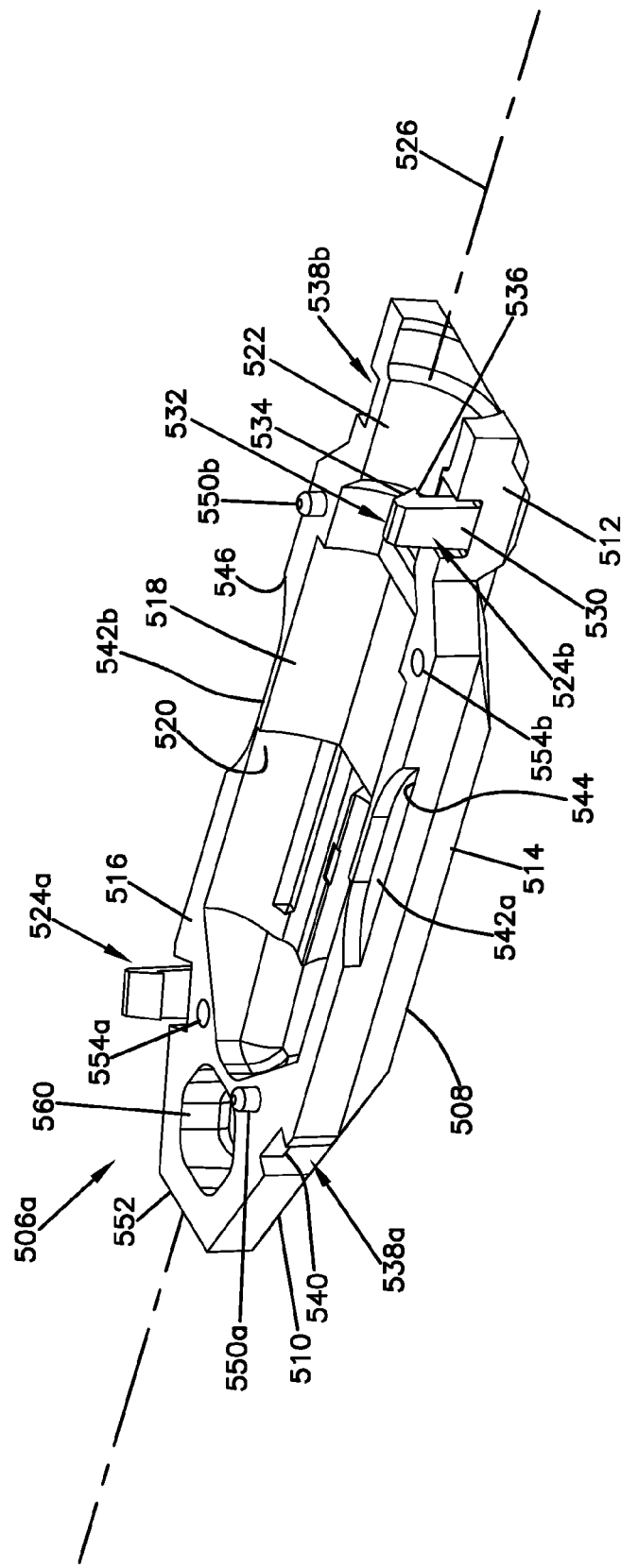
FIG. 21 is a perspective view of a first member of the cable pulling assembly of FIG. 19.

Referring now to FIGS. 20 and 21, the first member 506 includes a body 508. The body 508 of the first member 506a includes a first axial end portion 510 and an oppositely disposed second axial end portion 512.

The body 508 includes a plurality of exterior surfaces 514 and a longitudinal surface 516. The longitudinal surface 516 extends between the first and second axial end portions 510, 512 and is generally planar in shape. The longitudinal surface 516 is adapted to face a corresponding longitudinal surface 516' of the second member 506b when the first and second members 506a, 506b are engaged. In one embodiment, the longitudinal surface 516 of the first member 506a is adapted to abut the corresponding longitudinal surface 516' of the second member 506b when the first and second members 506a, 506b are engaged.

The body 508 defines a cavity 518. The cavity 518 is adapted to receive a portion of the end 503 of the fiber optic cable 504. In one aspect of the present disclosure, the cavity 518 is a blind cavity. As a blind cavity, the cavity 518 does not extend through the first and second axial end portions 510, 512 of the body 508. The blind cavity prevents the fiber optic cable 504 from passing through the first and second axial end portions 510, 512 of the body 508 of the enclosure 502.

The cavity 518 of the first member 506a includes an opening 520 that is defined by the longitudinal surface 516. The opening 520 is adapted to receive the portion of the end 503 of the fiber optic cable 504.

The cavity 518 includes a channel 522 that extends through the second axial end portion 512 of the body 508. In one aspect of the present disclosure, the channel 522 is semi-cylindrical in shape. The channel 522 is adapted to receive a portion of the fiber optic cable 504.

The body 508 further includes a first resilient tab 524a and a second resilient tab 524b. In one aspect of the present disclosure, the first resilient tab 524a is disposed at the first axial end portion 510 of the body 508 while the second resilient tab 524b is disposed at the second axial end portion 512 of the body 508. The first and second tabs 524a, 524b extend outwardly from the body 508 so that the first and second tabs 524a, 524b extend beyond the longitudinal surface 516 of the first member 506a. In another aspect of the present disclosure, the first and second resilient tabs 524a, 524b are disposed on opposite sides of a central longitudinal axis 526 that extends between the first and second axial end portions 510, 512 of the body 508.

Each of the first and second resilient tabs 524a, 524b includes a base end 530 and a free end 532. The base end 530 is engaged to the body 508. The free end 532 extends outwardly from the body 508 in a direction that is generally perpendicular to the longitudinal surface 516. The free end 532 includes a lip portion 534 that extends outwardly from the free end 532. The lip portion 534 includes a lip 536.

The body 508 defines a first groove 538a and a second groove 538b disposed in the exterior surfaces 514 of the body 508. The first and second grooves 538a, 538b include groove openings 540 defined by the longitudinal surface 516. The first groove 538a is disposed in the first axial end portion 510 of the body 508 of the first member 506a on the opposite side of the central longitudinal axis 526 from the first resilient tab 524a while the second groove 538b is disposed in the second axial end portion 512 of the body on the opposite side of the central longitudinal axis 526 from the second resilient tab 524b. The first groove 538a is generally axially aligned with the first resilient tab 524a while the second groove 538b is generally axially aligned with the second resilient tab 524b. Each of the first and second grooves 538a, 538b includes a rim 540.

In one aspect of the present disclosure, the longitudinal surface 516 of the body 508 defines a first recess 542a. The first recess 542a is disposed between the first groove 538a and the second resilient tab 524b. The first recess 542a includes a first opening 544 in one of the exterior surfaces 514. The first recess 542a extends inwardly from the exterior surface 514 toward the cavity 518 in a direction that is generally perpendicular to the central longitudinal axis 526.

In one aspect of the present disclosure, the longitudinal surface 516 of the body 508 further defines a second recess 542b. The second recess 542b is disposed between the first resilient tab 524a and the second groove 538b. The second recess 524b is axially aligned with the first recess 542a. The second recess 542b includes a second opening 546 in one of the exterior surfaces 514. The second recess 542b extends inwardly from the exterior surface 514 toward the cavity 518 in a direction that is generally perpendicular to the central longitudinal axis 526.

The body 508 further includes a plurality of alignment guides 550. In the depicted embodiment of FIGS. 20 and 21, the first member 506a includes a first alignment guide 550a and a second alignment guide 550b. The first and second alignment guides 550a, 550b extend outwardly from the longitudinal surface 516. In the depicted embodiment of FIGS. 20 and 21, the first and second alignment guides 550a, 550b are generally cylindrical in shape.

The first and second alignment guides 550a, 550b are disposed on opposite sides of the central longitudinal axis 526. The first alignment guide 550a is disposed in the first axial end portion 510 of the body 508 while the second alignment guide 550b is disposed in the second axial end portion 512. The first alignment guide 550a is disposed between the first recess 542a and a first end 552 of the first axial end portion 510 of the body 508. The second alignment guide 550b is disposed between the second recess 542b and the second groove 538b.

The longitudinal surface 516 defines a plurality of alignment openings 554. The alignment openings 554 of the first member 506a are adapted to receive corresponding alignment guides 550' of the second member 506b. In the depicted embodiment of FIGS. 20 and 21, the longitudinal surface 516 defines a first alignment opening 554a and a second alignment opening 554b. The first and second alignment openings are disposed on opposite sides of the central longitudinal axis 526. The first alignment opening 554a is disposed in the first axial end portion 510 of the body 508 while the second alignment opening 554b is disposed in the second axial end portion 512. The first alignment opening 554a is axially aligned with the first alignment guide 550a but disposed on the opposite side of the central longitudinal axis 526. The second alignment opening 554b is axially aligned with the second alignment guide 550b but disposed on the opposite side of the central longitudinal axis 526. In the depicted embodiment of FIGS. 20 and 21, the first alignment opening 554a is disposed between the second recess 542b and the first end 552 while the second alignment opening 554b is disposed between the first recess 542a and the first resilient tab 524a.

The body 508 of the first member 506a further defines a thru-passage 560 disposed in the first axial end portion 510 of the body 508. The thru-passage 560 is a hole that extends through the first axial end portion 510 in a direction that is generally perpendicular to the central longitudinal axis 526. The thru-passage 560 is adapted to receive a pulling member (e.g., rope, chain, etc.) for pulling the cable pulling assembly 500 through a passage.

Figure 22:
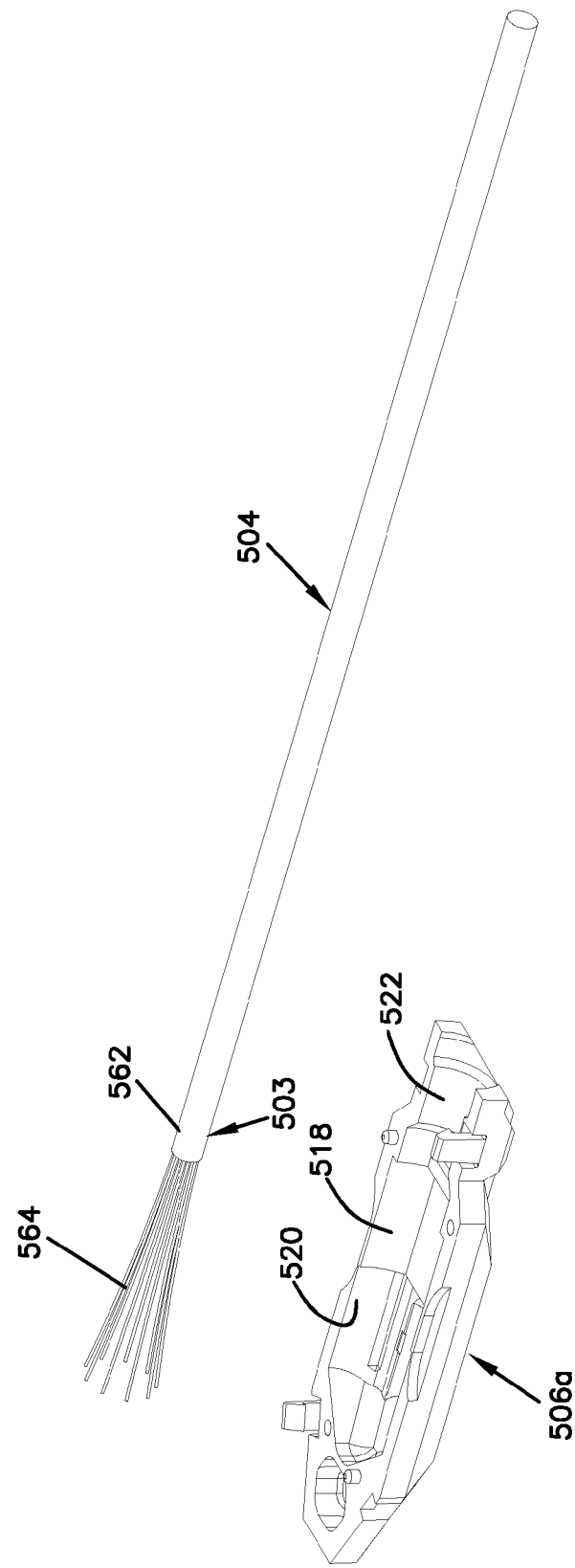
FIG. 22 is an exploded perspective view of a fiber optic cable and the first member of the cable pulling assembly.
Figure 23:
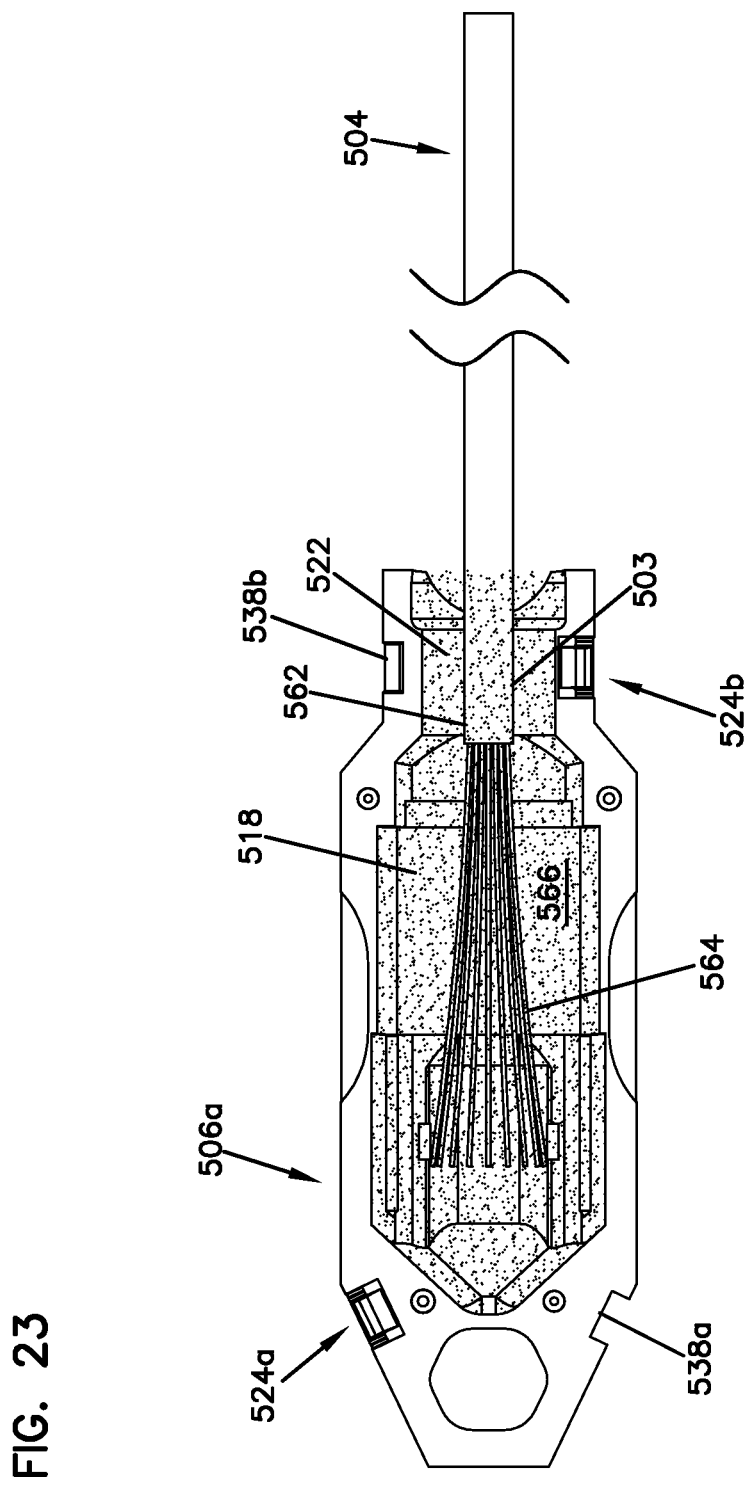
FIG. 23 is a top view of the fiber optic cable and the first member of the cable pulling assembly.

Referring now to FIGS. 20, 22 and 23, a method for installing the cable pulling assembly 500 on the end 503 of the fiber optic cable 504 will be described. In the depicted embodiment of FIGS. 20, 22 and 23, a portion of an outer jacket 562 of the fiber optic cable 504 is stripped from the end 503 of the fiber optic cable 504. With the portion of the outer jacket 562 removed from the end 503 of the fiber optic cable 504, a strength member 564 of the fiber optic cable 504 is exposed. In one embodiment, the strength member 564 is part of a plurality of strength members 564 forming a strength layer of the fiber optic cable 504. In one embodiment, the plurality of strength members 564 can include yarns, fibers, threads, tapes, films, epoxies, filaments or other structures. In the depicted embodiment, the plurality of strength members 564 includes a plurality of aramid yarns (e.g., KEVLAR® yarns). In another embodiment, the strength member 564 is a single strength member such as a rod.

The end 503 of the fiber optic cable 504 with the exposed strength members 564 is inserted through the opening 520 of the cavity 518 of the first member 506a of the enclosure 502. With the end 503 of the fiber optic cable 504 disposed in the cavity 518 of the first member 506a, a remaining portion of the outer jacket 562 of the end 503 is disposed in the channel 522 so that the fiber optic cable 504 extends out the second axial end portion 512 of the cable pulling assembly 500.

With the end 503 of the fiber optic cable 504 disposed in the cavity 518 of the first member 506a, an adhesive 566 (shown as shading in FIG. 23) is added to the cavity 518. In one embodiment, the adhesive 566 is an epoxy. When the adhesive 566 is cured, the adhesive 566 bonds the outer jacket 562 and the plurality of strength members 564 of the end 503 of the fiber optic cable 504 to the cavity 518 of the first member 506a. With the adhesive 566 in the cured state, the end 503 of the fiber optic cable 504 in the cavity 518 is secured in the first member 506a.

The second member 506b is then engaged to the first member 506a. To engage the first and second members 506a, 506b, the longitudinal surface 516' of the second member 506b is oriented so that it faces the longitudinal surface 516 of the first member 506a. With the longitudinal surfaces 516, 516' of the first and second members 506a, 506b facing each other, the first and second resilient tabs 524a, 524b of the first member 506a are aligned with the first and second grooves 538a, 538b of the second member 506b and the first and second alignment guides 550a, 550b are aligned with the first and second alignment openings 554a, 554b.

One of the first and second members 506b is then pushed toward the other of the first and second members 506a, 506b until the lips 536 of the first and second resilient tabs 524a, 524b of the first and second members 506a, 506b engage the corresponding rims 540 of the first and second grooves 538a, 538b of the first and second members 506a, 506b. In one embodiment, the first and second members 506a, 506b are pushed together until an audible clicking sound is heard. The audible clicking sound is produced by the engagement of the first and second resilient tabs 524a, 524b of the first and second members 506a, 506b to the rims 540 of the first and second grooves 538a, 538b of the first and second members 506a, 506b.

With the first and second resilient tabs 524a, 524b of the first and second members 506a, 506b engaged with the corresponding first and second grooves 538a, 538b on the mating member, the first and second alignment guides 550a, 550b of the first and second members 506a, 506b are disposed in the corresponding alignment openings 554a, 554b of the mating member. The engagement between the first and second alignment guides 550a, 550b and the first and second alignment openings 554a, 554b prevents inadvertent disengagement caused by rotation of one of the first and second members 506a, 506b relative to the other of the first and second members 506a, 506b.

Referring still to FIGS. 20, 22 and 23, an alternate method for installing the cable pulling assembly 500 on the end 503 of the fiber optic cable 504 will be described. A portion of the outer jacket 562 is stripped from the end 503 of the fiber optic cable 504 so that the strength members 564 are exposed. With the strength members 564 of the end 503 of the fiber optic cable 504 exposed, the end 503 is inserted through the opening 520 of the cavity 518 of the first member 506a of the enclosure 502.

The second member 506b is then engaged to the first member 506a by pushing one of the first and second members 506b toward the other of the first and second members 506a, 506b until the lips 536 of the first and second resilient tabs 524a, 524b of the first and second members 506a, 506b engage the corresponding rims 540 of the first and second grooves 538a, 538b of the first and second members 506a, 506b. With the first and second members 506a, 506b engaged and the end 503 of the fiber optic cable 504 disposed in the cavity 518, adhesive 566 is injected into the cavity 518 of the enclosure 502 through the channel 522.

After the adhesive 566 cures, a pulling member is inserted through the thru-passage 560 of the first and second members 506a, 506b. The fiber optic cable 504 can then be pulled to the desired location.

In conventional cable pullers, the cable puller is fixed to the cable jacket of the fiber optic cable. As the fiber optic cable is pulled to its desired location, the tensile force acting on the cable puller is transferred to the cable jacket, which causes the cable jacket to stretch. After the pulling of the fiber optic cable is complete, the cable jacket returns to its original (i.e., unstretched) length. As the cable jacket returns to its original length, micro-bends in the optical fiber of the fiber optic cable are created. The micro-bends can cause attenuation loses in the fiber optic cable.

The cable pulling assembly 500 of the present disclosure reduces the risk of micro-bends by bonding the enclosure 502 to the strength layer of the fiber optic cable 504. With the adhesive 566 bonding the enclosure 502 and the strength members 564 of the fiber optic cable 504, the risk of creating micro-bends in an optical fiber of the fiber optic cable 504 is reduced since the pulling force applied to the enclosure 502 is carried by the strength members 564 of the fiber optic cable 504. By applying the tensile force to the strength members 564, the amount of stretching of the outer jacket 564 is reduced.

After the fiber optic cable 504 has been pulled to the desired location, the cable pulling assembly 500 can be removed from the fiber optic cable 504. In one embodiment, the cable pulling assembly 500 is removed from the fiber optic cable 504 by cutting off the end 503 of the fiber optic cable 504 from the fiber optic cable 504. In one aspect of the present disclosure, the cable pulling assembly 500 is reusable. In another aspect of the present disclosure, the cable pulling assembly 500 is disposable.

Various modifications and alterations of this disclosure will become apparent to those skilled in the art without departing from the scope and spirit of this disclosure, and it should be understood that the scope of this disclosure is not to be unduly limited to the illustrative embodiments set forth herein.

What is claimed is:

1. A removable cable pulling assembly comprising:
a removable enclosure adapted for enclosing an end of a fiber optic cable and a fiber optic connector positioned at the end of the fiber optic cable, the removable enclosure including:
a removable first member defining a first cavity including a first end portion, the first end portion of the first cavity being adapted and contoured to removably engage the connector and to receive the end of the fiber optic cable; and
a removable second member structurally identical to the removable first member and being adapted to removably engage the removable first member and to be separable from the removable first member, the removable second member being kinematically independent from the removable first member upon separation from the removable first member, and the removable second member defining a second cavity;
wherein the removable enclosure is adapted to transfer a tensile force applied to the removable enclosure to a strength layer of the fiber optic cable by engagement of the first end portion of the first cavity with the connector.

2. The removable cable pulling assembly of claim 1, wherein the first cavity receives a portion of the connector and the second cavity receives a remaining portion of the connector.

3. The removable cable pulling assembly of claim 2, wherein the removable enclosure is adapted to engage an axial end of the connector when the tensile force is applied to the removable enclosure so that the tensile force is applied to the strength layer through the connector.

4. The removable cable pulling assembly of claim 1, wherein each of the removable first and second members includes a plurality of resilient tabs and a plurality of grooves, the grooves of the removable first member being adapted to receive the resilient tabs of the removable second member and the grooves of the removable second member being adapted to receive the resilient tabs of the removable first member.

5. The removable cable pulling assembly of claim 4, wherein each of the removable first and second members includes a first resilient tab and a second resilient tab, the first and second resilient tabs being disposed on opposite sides of a longitudinal axis of the removable enclosure.

6. The removable cable pulling assembly of claim 1, wherein at least one of the removable first and second members is translucent.

7. The removable cable pulling assembly of claim 1, wherein at least one of the removable first and second members defines a thru-passage that extends through a first axial end portion of the at least one of the removable first and second members.

8. The removable cable pulling assembly of claim 1, wherein the removable second member is adapted to removably engage the removable first member via a removable snap-fit engagement.

9. The removable cable pulling assembly of claim 1, wherein the second cavity of the removable second member includes a second end portion that is also adapted and contoured to removably engage the connector and wherein the second cavity is also adapted to receive the end of the fiber optic cable.

10. The removable cable pulling assembly of claim 9, wherein the removable enclosure is further adapted to transfer the tensile force applied to the removable enclosure to the strength layer of the fiber optic cable by engagement of the second end portion of the second cavity with an axial end of the connector.

11. The removable cable pulling assembly of claim 1, wherein the strength layer is crimped to the fiber optic connector.

12. A removable cable pulling assembly comprising:
a removable enclosure adapted for enclosing an end of a fiber optic cable and a fiber optic connector positioned at the end of the fiber optic cable, the fiber optic connector having an axial end, the removable enclosure including:
a removable first member, the removable first member including:
a first body having a longitudinal surface, the first body defining a first blind cavity having an opening in the longitudinal surface of the first body and a first end portion; and
a first plurality of resilient tabs engaged to the first body, the first plurality of resilient tabs extending beyond the longitudinal surface of the first body; and
a removable second member structurally identical to the removable first member and being in removable snap-fit engagement with the removable first member and being separable from the removable first member, the removable second member being kinematically independent from the removable first member upon separation from the removable first member, and the removable second member including:
a second body having a longitudinal surface, the second body defining a second blind cavity having an opening in the longitudinal surface of the second body; and
a second plurality of resilient tabs engaged to the second body, the second plurality of resilient tabs extending beyond the longitudinal surface of the second body, the second plurality of resilient tabs adapted for engagement with the removable first member;
wherein the end of the fiber optic cable is enclosed between the first and the second blind cavities;
wherein the removable enclosure is adapted to transfer a tensile force applied to the removable enclosure to a strength layer of the fiber optic cable by engagement of the first end portion of the first blind cavity with the axial end of the connector.

13. The removable cable pulling assembly of claim 12, wherein the longitudinal surface of each of the first and second bodies includes a plurality of alignment guides that extends outwardly from the longitudinal surfaces of the first and second bodies.

14. The removable cable pulling assembly of claim 12, wherein each of the removable first and second members defines a thru-passage that extends through a first axial end portion of each of the removable first and second members.

15. The removable cable pulling assembly of claim 12, wherein the removable first member includes a first plurality of grooves adapted to receive the second plurality of resilient tabs of the removable second member and the removable second member includes a second plurality of grooves adapted to receive the first plurality of resilient tabs of the removable first member.

16. The removable cable pulling assembly of claim 12, wherein at least one of the removable first and second members is translucent.

17. The removable cable pulling assembly of claim 12, wherein the second blind cavity of the second body of the removable second member includes a second end portion and wherein the removable enclosure is further adapted to transfer the tensile force applied to the removable enclosure to the strength layer of the fiber optic cable by engagement of the second end portion of the second blind cavity with the axial end of the connector.

18. The removable cable pulling assembly of claim 12, wherein the strength layer is crimped to the fiber optic connector.

19. A cable pulling assembly comprising:
a fiber optic cable having an end and a strength layer;
a connector engaged to the end of the fiber optic cable, the strength layer being crimped to the connector; and
a removable enclosure enclosing the connector of the fiber optic cable, the removable enclosure including:
a cavity including an end portion;
a removable first member defining a first portion of the cavity, the first portion of the cavity being adapted and contoured to removably engage a portion of the connector of the fiber optic cable; and
a removable second member structurally identical to the removable first member and being removably engaged to the removable first member and being separable from the removable first member, the removable second member being kinematically independent from the removable first member upon separation from the removable first member, and the removable second member defining a second portion of the cavity, the second portion of the cavity being adapted and contoured to receive a remaining portion of the connector of the fiber optic cable;
wherein the end portion of the cavity of the removable enclosure is adapted to engage an axial end of the connector when a tensile force is applied to the removable enclosure so that the tensile force is applied to the strength layer of the fiber optic cable through an engagement of the end portion of the cavity with the axial end of the connector.

20. The cable pulling assembly of claim 19, wherein at least one of the removable first and second members defines a thru-passage that extends through a first axial end portion of the at least one of the removable first and second members.

21. The cable pulling assembly of claim 19, wherein the removable second member is removably engaged to the removable first member via a removable snap-fit engagement.

22. The cable pulling assembly of claim 19, wherein the engagement of the end portion of the cavity with the axial end of the connector includes engagements of both the first and the second portions of the cavity with the axial end of the connector.

* * * * *